(12) United States Patent
Dages et al.

(10) Patent No.: US 11,597,244 B2
(45) Date of Patent: Mar. 7, 2023

(54) METHOD FOR MANAGING THE ENERGY OF A SYSTEM FOR VERIFYING THE INFLATION PRESSURE OF THE TIRES OF AN AIRCRAFT

(71) Applicants: SAFRAN LANDING SYSTEMS, Velizy-Villacoublay (FR); SAFRAN ELECTRONICS & DEFENSE, Boulogne-Billancourt (FR)

(72) Inventors: Olivier Dages, Moissy-Cramayel (FR); Didier Levavasseur, Boulogne-Billancourt (FR); Stéphanie Nocente, Boulogne-Billancourt (FR)

(73) Assignees: SAFRAN LANDING SYSTEMS, Velizy-Villacoublay (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 379 days.

(21) Appl. No.: 16/922,764

(22) Filed: Jul. 7, 2020

(65) Prior Publication Data
US 2021/0039450 A1   Feb. 11, 2021

(30) Foreign Application Priority Data
Aug. 5, 2019   (FR) ...................... 1908971

(51) Int. Cl.
*B60C 23/04*   (2006.01)
*B64F 5/60*   (2017.01)
(Continued)

(52) U.S. Cl.
CPC ...... *B60C 23/0474* (2013.01); *B60C 23/0416* (2013.01); *B60C 23/0488* (2013.01);
(Continued)

(58) Field of Classification Search
None
See application file for complete search history.

(56) References Cited

U.S. PATENT DOCUMENTS

| 6,902,136 B2* | 6/2005 | Mackness | G01P 3/488 |
| | | | 244/100 R |
| 8,686,590 B2* | 4/2014 | Bugash | H02J 50/80 |
| | | | 307/9.1 |

(Continued)

FOREIGN PATENT DOCUMENTS

| EP | 3 118 030 A1 | 1/2017 |
| EP | 3 498 501 A1 | 6/2019 |
| FR | 2822755 | 10/2002 |

OTHER PUBLICATIONS

French Search Report in corresponding FR Application No. 1908971, dated Feb. 20, 2020, (7 pages).

*Primary Examiner* — Peter J Macchiarolo
*Assistant Examiner* — Jermaine L Jenkins
(74) *Attorney, Agent, or Firm* — Bookoff McAndrews, PLLC

(57) ABSTRACT

Method for managing the energy in a system for verifying the inflation pressure of the tires of an aircraft, consisting in measuring, by a pressure sensor, at least one inflation pressure of each of the tires, obtaining a unique identification data relating to each of the tires, and sending via the wireless communication link the measurements and data thus collected to a processing unit disposed in or out of the aircraft for them to be available to a pilot or a maintenance operator, the step of sending the measurements and data being carried out in an acyclic manner as a function of a trigger signal given by a motion detector that detects the motion of the wheels of the aircraft as long as the speed is lower than a predetermined maximum speed.

13 Claims, 1 Drawing Sheet

(51) Int. Cl.
  *G01C 9/00* (2006.01)
  *G01C 19/00* (2013.01)
  *G01P 3/00* (2006.01)

(52) U.S. Cl.
  CPC ............... *B64F 5/60* (2017.01); *G01C 9/005* (2013.01); *G01C 19/00* (2013.01); *G01P 3/00* (2013.01)

(56) References Cited

U.S. PATENT DOCUMENTS

| | | | | |
|---|---|---|---|---|
| 9,193,223 | B2* | 11/2015 | Keller | B64C 25/36 |
| 2016/0159469 | A1* | 6/2016 | Vana | B64C 25/405 |
| | | | | 137/14 |
| 2017/0087943 | A1* | 3/2017 | Bill | B60C 23/0484 |
| 2017/0217572 | A1* | 8/2017 | Vana | B60C 23/0408 |
| 2019/0016319 | A1* | 1/2019 | Thompson | B64C 25/34 |

* cited by examiner

METHOD FOR MANAGING THE ENERGY OF A SYSTEM FOR VERIFYING THE INFLATION PRESSURE OF THE TIRES OF AN AIRCRAFT

CROSS-REFERENCE TO RELATED APPLICATION(S)

This application claims priority to French Patent Application No. 1908971, filed on Aug. 5, 2019, the disclosure of which is incorporated herein by reference in its entirety.

TECHNICAL FIELD

The present invention relates to a method for managing the energy of a system for verifying the inflation pressure of the tires of an aircraft during different flight phases or within the context of maintenance operations.

PRIOR ART

From the cockpit or during maintenance operations, it is useful to know the pressure of the tires of the different wheels of the landing gear of an aircraft.

To this end, it is known to use a sensor for measuring the pressure of the tires of such an aircraft directly installed on the wheel. This sensor known as TPMS (Tire Pressure Monitoring System), coupled to an on-board data processing system, allows the pilots to have a display in the cockpit of the state of the pressure of each of the tires during the different flight phases. During the maintenance operations, the operators, while moving around in the cockpit, can also check this display in order to obtain the desired information.

Each TPMS mounted on a wheel rim is powered and communicates using a cable connecting it to a rotary contact installed in the wheel hub. However, this wired connection, subjected to a severe environment in terms of shocks, the cables being for example likely to be torn off during human activities around the wheels, of vibration in particular during the retractions/extensions of the landing gear, and of temperature, is a weak point in the system.

A known alternative to this problem has been to protect the power/communication cable using a mechanical arm and to eliminate the rotating contact by means of an electromagnetic adaptation. Although this solution helped to improve reliability and better guarantee the service life of the system, it was unfortunately made at the expense of an extra space requirement on the wheel.

Also, the applicant has proposed in its patent FR2822755 to delete the previous wired architecture and to replace it with a wireless communication system between each of the wheels including a pressure sensor and provided with a rotating antenna and an operating unit remote from the landing gear and provided with a fixed antenna, this operating unit being alone in wired connection with the cockpit.

Although this solution is generally satisfactory, it still suffers from some drawbacks. The regular reporting of data from the pressure sensors (3 to 22 in number depending on the current types of aircrafts) is likely to impair their autonomy, whereas it is necessary to reach lifetimes of up to 10 years. The identification and the processing of these data must also be able to be perfectly individualized, by excluding information coming from another aircraft, while ensuring worldwide operability. Finally, the transmission power must not be able to disturb the aircraft's navigation systems.

DISCLOSURE OF THE INVENTION

The invention therefore proposes to overcome these drawbacks by adapting, as a function of the flight phases, the frequency of recurrence of the pressure measurements, by optimizing the communication protocol as a function of these phases and of the operation (to adapt to different propagation conditions).

These aims are achieved by a method for managing the energy in a system for verifying the inflation pressure of the tires of an aircraft comprising the following steps:

measuring, by a pressure sensor, at least one inflation pressure of each of the tires, obtaining a unique identification data relating to each of the tires, sending, via a wireless communication link, the measurements and data thus collected to a processing unit disposed in or out of the aircraft for them to be available to a pilot or a maintenance operator, characterized in that the step of sending the measurements and data is carried out in an acyclic manner as a function of a trigger signal given by a motion detector that detects the motion of the wheels of the aircraft as long as the speed is lower than a predetermined maximum speed, this sending step being interrupted and the pressure sensor put on standby when this maximum speed is exceeded, and in that, on an alert, intermediate data sending sequences can be triggered during this sending step.

Thus, despite the limited capacity of the energy reservoirs on which the activation of so the pressure sensors depends, it becomes possible to envisage missions of up to ten years, corresponding to the current service life of the pressure sensors, while keeping the possibility of a rapid reaction in the event of an alert.

Advantageously, the step of sending the measurements and data is triggered at a predetermined periodicity from a few seconds to a few minutes or from a few minutes to a few hours, depending on whether a motion of the wheels of the aircraft is detected or not.

Preferably, the step of sending the measurements and data also includes sending monitoring data relating at least to the state of the pressure sensor and of the wireless communication link.

Advantageously, the step of sending the measurements and data is preceded by a timestamp of the measurements and/or by an encryption of the measurements and data, typically by an AES 128 type signature.

Preferably, the step of sending the measurements and data is carried out either in the form of n successive transmissions, n corresponding to the number of pressure sensors communicating simultaneously, or in the form of a single transmission following a processing of n pressure measurements collected beforehand.

Advantageously, the processing includes one of the following operations: averages, linear regressions or any other operations to improve the accuracy and stability of the pressure measurements.

Preferably, the measuring step further includes the measurement of the temperature of each of the tires.

Advantageously, characterized in that the wireless communication link is carried out on one of the following frequency bands: ISM band at 2.4 GHz, WAIC band between 4.2 and 4.4 GHz.

Preferably, the motion detector is an inclinometer, an accelerometer or a gyroscope for detecting the motion of the wheels of the aircraft.

DESCRIPTION OF THE EMBODIMENTS

Figure 1:
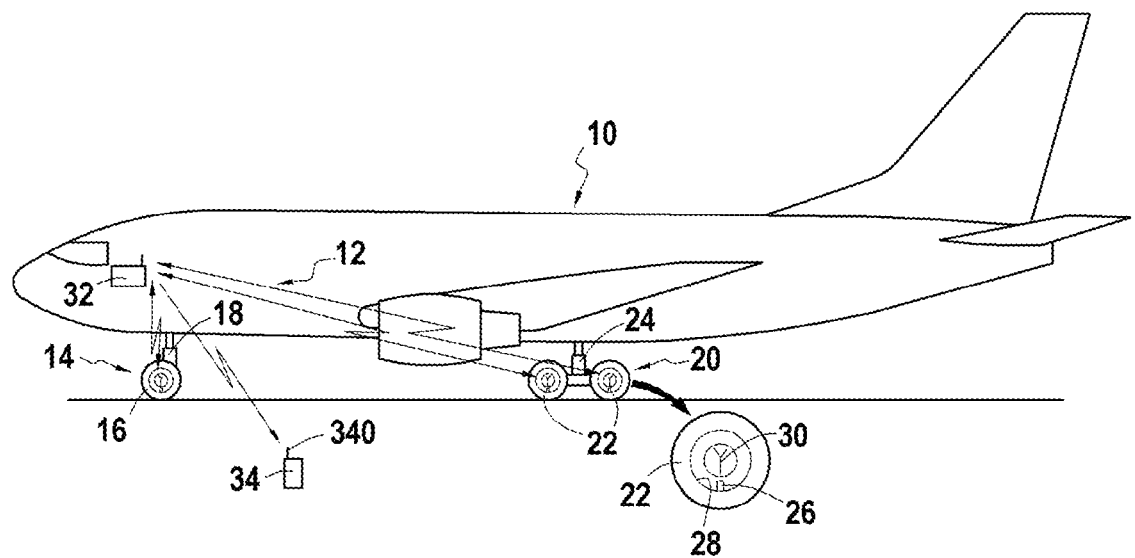
FIG. 1 is a schematic view of an aircraft equipped with a pressure verification system implementing the method of the invention, and FIG. 2 schematically illustrates the various operations allowing the communication of information in the method of the invention.

FIG. 1 represents very schematically an aircraft 10 equipped with a system 12 for verifying the inflation pressure of the tires of each of the wheels of this aircraft.

In the example illustrated, this aircraft is provided, on the one hand at the front, with a first landing gear element 14 including two wheels 16 mounted on a common axis at the end of a first landing gear strut 18 and, on the other hand substantially in the center of the aircraft on either side of its longitudinal axis, with the second and third landing gear elements 20 (only the second one appears in the figure) each including for example four wheels 22 mounted on two common axes parallel to the end of a second landing gear strut 24.

To each tire fitted to a wheel of the aircraft corresponds a pressure sensor 26 carried by the rim 28 of the wheel and an antenna 30 called rotating antenna because it follows the rotation of the wheel, by means of which at least the pressure information derived from the pressure sensor will be transferred via a wireless communication link to a display module (possibly via an intermediate processing module not illustrated including a fixed antenna intended to communicate with the rotating antenna) disposed apart from this wheel.

Typically, this wireless communication link is carried out, according to the disposition of the display module or of the intermediate processing module integrating the fixed antenna and the associated communication means, on the ISM (Industrial, Scientific and Medical) band at 2.4 GHz or on the WAIC (Wireless Avionics Intra-Communications) band between 4.2 and 4.4 GHz. The pressure sensor conventionally consists of a transducer adapted to convert the internal pressure of the tire into an electrical signal and of a processing unit to associate with this electrical signal a pressure value as well as at least one identifier of the concerned tire, stored in a battery backed memory, which can be rechargeable or not and associated with this processing unit.

The display module which allows the display of the various inflation pressures derived from the various tires advantageously consists of a device 32 disposed in the aircraft, secured to its structure and fixed permanently, for example in the cockpit of the aircraft, and from which this pressure information or the like can be downloaded to a portable device 34 destined for a pilot or a maintenance operator. In an advantageous variant, this display module will consist of the only portable device 34 towards which the pressure sensors will directly communicate via the wireless link between the rotating antenna 30 and the antenna 340 integrated into the portable device.

However, this advantageous particular disposition cannot be considered as limiting and any other disposition is also possible. Thus, it is not necessary for each pressure sensor to communicate with a single receiver placed in or out of the aircraft, it is indeed possible that the pressure sensors placed on the gears communicate with one or more receivers located closest to the wheel, on the landing gear strut or at the gear well, for example, or that the pressure sensors placed on the front gear communicate with an access point located at or under the cockpit and those of the rear gears with an access point located either at the fuselage or at the wings opposite the receivers. In all cases, it will be advantageous that these receivers include firewall-type protection means to protect the communications of the aircraft from outside.

Figure 2:
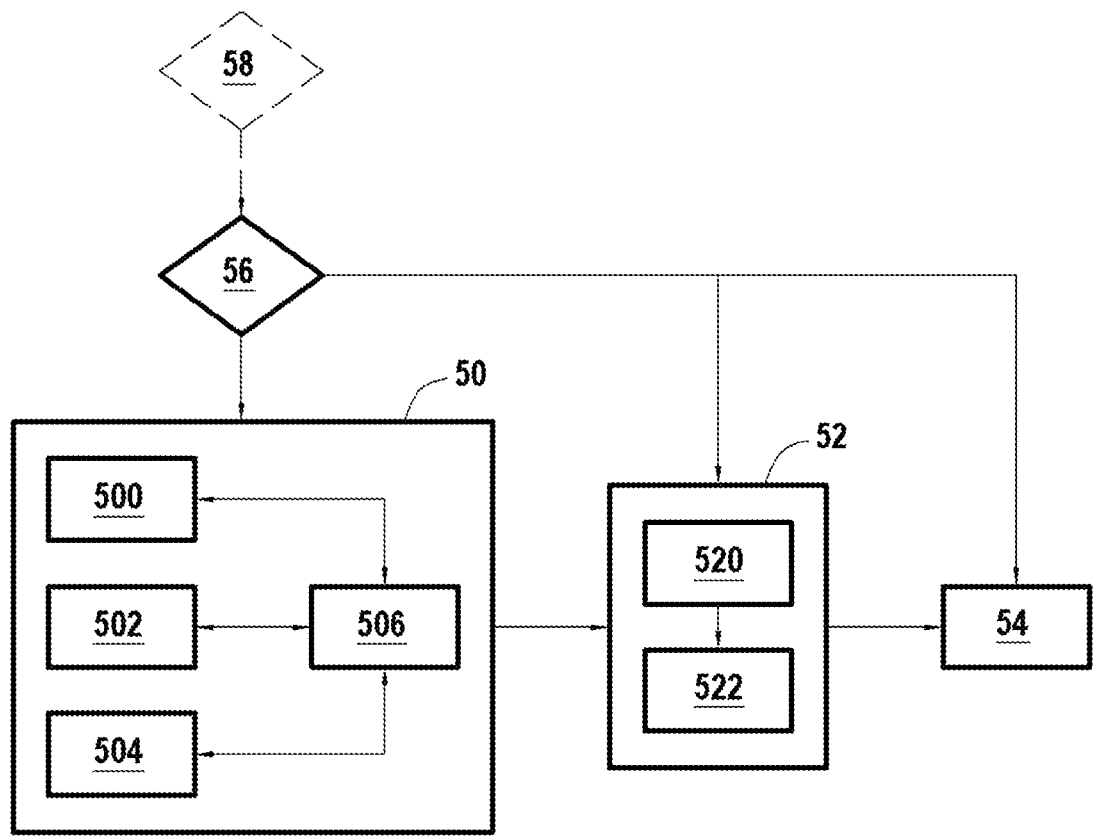

As shown in FIG. 2, the management of the communication implements three successive operations: a collection of the data 50, a sending of these data 52 and a standby of the communication 54 at the end of this sending, the whole being under the control of the time spent delivered by a counter 56 or one or more clocks 56. Indeed, the pressure sensors can each include an internal clock which can be regularly synchronized with a central clock to ensure the proper refreshing of the measurements or ensure a communication strategy on request. The data collection includes a collection 500 of the various pressure measurements, a collection 502 of the identification data of the pressure sensors and a collection 506 of the monitoring data relating for example to the state of the measurement, to the state of the wireless communication or to the state of the battery, these various measurements and data having their validity verified and being preferably timestamped 506. It may be noted that a pairing of the wheel can be performed using a configuration file and that the timestamp of the pressure derived from the sensor can also be compared with that of the receiver in order to ensure the contiguity and the non-obsolescence of the received pressure measurements.

Sending these data in the form of n successive or non-successive transmissions (i.e. communicating at the same time), n depending for example on the number of sensors installed on the aircraft (depending on the number of fitted wheels) to avoid any loss of the messages, includes a formatting 520 (shaping according to the retained communication protocol) and preferably an encryption of these data 522. However, it should be noted that it is also possible to process these n collected data before activating in one time the transmission then the standby sequence. This processing can be accompanied by the achievement of averages, linear regressions and any other known operations to improve the accuracy and stability of the pressure measurements, which can be adapted according to the temperature, when in addition to the pressure sensor, a tire temperature sensor is available at the rim of the wheel.

In order to optimize energy consumption, this sending of the collected data is carried out in an acyclic manner as opposed to a cyclic sending of these data in which the data are sent in a cyclic manner at a frequency defined in advance according to an operational need and therefore the limited battery life as a function of the chosen periodicity (typically of the order of the minute) and of the number of redundancies necessary to guarantee the value of the received data (typically three redundancies). This acyclic sending is based on the use of a device making it possible to detect the motion of the wheel, based on a motion detector 58 which can be for example an inclinometer, an accelerometer or a gyroscope, and which will act on the counter or the clock 56 to trigger the sending of the data.

Thus, when no wheel motion is detected, the data sending periodicity is of the order of the hour (or a few hours depending on operational need). However, on an alert, intermediate data sending sequences (with a periodicity which can be reduced to a few minutes) can be triggered. However, when a motion of a wheel is detected and possibly considered to be sufficiently long, the communication sequences allowing sending the collected data are triggered with a predetermined periodicity which can range from a few seconds to a few minutes depending on the operational need, as long as the speed is lower than a predetermined maximum speed, for example 30 knots. When this maximum speed is exceeded, the sending is interrupted and the pressure sensor is put on standby.

The periodicity of the measurements may not be matched with that of the sending of data, for example may be made more quickly and generate conditions of triggering is intermediate sending sequences (for example: detection of outlier data, exceeding of thresholds, etc.).

The invention claimed is:

1. A method for managing an energy in a system for verifying an inflation pressure of tires of an aircraft, comprising:
    measuring, by a pressure sensor, at least one inflation pressure of each of the tires,
    obtaining a unique identification data relating to each of the tires,
    sending, via a wireless communication link, the measurements made by the pressure sensor and the data thus collected to a processing unit disposed in or out of the aircraft for the measurements and the data to be available to a pilot or a maintenance operator,
    wherein sending the measurements and the data is carried out in an acyclic manner as a function of a trigger signal given by a motion detector that detects the motion of wheels of the aircraft as long as a speed is lower than a predetermined maximum speed, the sending of the measurements and the data being interrupted and the pressure sensor put on standby when the predetermined maximum speed is exceeded, and in that, on an alert, intermediate data sending sequences are triggered during the sending of the measurements and the data.

2. The method according to claim 1, wherein sending the measurements and the data is triggered at a predetermined periodicity from a few seconds to a few minutes or from a few minutes to a few hours, depending on whether a motion of the wheels of the aircraft is detected or not.

3. The method according to claim 1, wherein sending the measurements and the data further includes sending monitoring data relating at least to a state of the pressure sensor and of the wireless communication link.

4. The method according to claim 1, wherein sending the measurements and the data is preceded by a timestamp of the measurements.

5. The method according to claim 1, wherein sending the measurements and the data is preceded by an encryption of the measurements and data.

6. The method according to claim 5, wherein the encryption is an AES 128 type signature.

7. The method according to claim 1, wherein sending the measurements and the data is carried out either in a form of n successive transmissions, n corresponding to a number of pressure sensors communicating simultaneously, or in the form of a single transmission following a processing of n pressure measurements collected beforehand.

8. The method according to claim 7, wherein the processing includes one of the following operations: averages, linear regressions or any other operations to improve accuracy and stability of the pressure measurements.

9. The method according to claim 1, wherein measuring further includes measuring a temperature of each of the tires.

10. The method according to claim 1, wherein the wireless communication link is carried out on one of the following frequency bands: ISM band at 2.4 GHz, WAIC band between 4, 2 and 4.4 GHz.

11. The method according to claim 1, wherein the motion detector is an inclinometer, an accelerometer or a gyroscope for detecting the motion of the wheels of the aircraft.

12. A method for managing an energy in a system for verifying an inflation pressure of tires of an aircraft, comprising:
    receiving, from a pressure sensor, at least one inflation pressure of each of the tires,
    obtaining a unique identification data relating to each of the tires,
    sending, via a wireless communication link, the at least one inflation pressure of each of the tires and the unique identification data thus collected to a processing unit disposed in or out of the aircraft for the at least one inflation pressure of each of the tires and the unique identification data to be available to a pilot or a maintenance operator,
    wherein sending the at least one inflation pressure of each of the tires and the unique identification data is carried out in an acyclic manner as a function of a trigger signal given by a motion detector that detects the motion of wheels of the aircraft as long as a speed is lower than a predetermined maximum speed, the sending of the at least one inflation pressure of each of the tires and the unique identification data being interrupted and the pressure sensor put on standby when the predetermined maximum speed is exceeded, and in that, on an alert, intermediate data sending sequences are triggered during the sending of the at least one inflation pressure of each of the tires and the unique identification data.

13. A method for managing an energy in a system for verifying an inflation pressure of tires of an aircraft, comprising:
    receiving, at one or more processing units disposed in or out of the aircraft, via a wireless communication link, measurements and data to be available to a pilot or a maintenance operator, wherein the measurements are made by a pressure sensor of at least one inflation pressure of each of the tires,
    wherein the data includes unique identification data that relates to each of the tires,
    wherein receiving the measurements and data is carried out in an acyclic manner as a function of a trigger signal given by a motion detector that detects the motion of wheels of the aircraft as long as a speed is lower than a predetermined maximum speed, the receiving of the measurements and the data being interrupted and the pressure sensor put on standby when the predetermined maximum speed is exceeded, and in that, on an alert, intermediate data sending sequences are triggered during the receiving of the measurements and the data.

* * * * *